United States Patent [19]
Bore

[11] 3,750,699
[45] Aug. 7, 1973

[54] VALVES
[75] Inventor: Raymond Bore, Saint Etienne, France
[73] Assignee: Bennes Marrel, Saint-Etienne (Loire), France
[22] Filed: Oct. 12, 1971
[21] Appl. No.: 188,055

[30] Foreign Application Priority Data
Oct. 9, 1970 France .............................. 7037344

[52] U.S. Cl. ............................... 137/494, 251/61.1
[51] Int. Cl. ........................................... F16k 31/145
[58] Field of Search ......................... 137/494, 525; 251/61.1

[56] References Cited
UNITED STATES PATENTS
3,272,470 9/1966 Bryant ........................... 137/494 X
3,515,166 6/1970 Paccard ......................... 251/61.1 X Primary Examiner—Henry T. Klinksiek
Attorney—Richard C. Sughrue et al.

[57] ABSTRACT

A safety valve for use in the hydraulic system of hydraulic pit props in which the valve has a hollow body mounting inside a cut-off member which is resiliently urged to a sealing position between inlet and outlet pipes. The cut-off member is a deformable member having a blind bore therein. The deformable cut-off member extends through an anti-extrusion ring and passage means are provided between the body of the valve and the anti-extrusion ring.

7 Claims, 5 Drawing Figures

VALVES

This invention relates to valves, especially safety valves for use with hydraulic pit props.

It is known that hydraulic pit props used in mines must be able to contract progressively as the roof sags. For this purpose, a valve is provided in the hydraulic circuit, which is able to withstand considerable pressure and to create a slight leakage as soon as the pressure exceed a given threshold. Such a valve may be a sliding valve mounted on the prop, the valve comprising a cut-off member which is resiliently closed and which is raised temporarily in order to create a slight leak as soon as the pressure exceeds the predetermined threshold or value.

Slide valves known at this time have various disadvantages which result either from the poor fluid-tightness of the cut-off member after a certain duration of operation, or from a poor resistance of this cut-off member to pressure waves or hammering. In particular, if the cut-off member is constituted by a part of flexible material which tends to stretch under the effect of pressure, hammering destroys the seal. The whole of the pit prop support system becomes locked and a leakage of liquid is observed, for example in a chamber containing compressed nitrogen, if the resilient return of the valve is effected by a cushion of gas.

An object of the present invention is to avoid these disadvantages by providing a valve comprising a flexible seal and able to resist pressure waves particularly well.

A safety valve according to the invention comprises a rigid hollow body inside which is located a cut-off member returned resiliently to the closed position between a pressure inlet pipe and an egress pipe and it is characterised in that the cut-off member is constituted by a stopper seal of deformable material formed with an outer cylindrical wall, the base of which passes through a rigid anti-extrusion ring behind which the stopper seal widens out into a transverse shoulder, the anti-extrusion ring bearing against an inner shoulder of the body, egress means being provided between the body and the anti-extrusion ring and the fluid-tightness of the stopper seal being ensured, in the normal position, by the outer cylindrical face of the latter, whose end is connected to the inlet pipe for fluid under pressure.

The anti-extrusion ring is preferably made in the form of a ring, whose plane face bearing against the body is provided with radial notches allowing leakage of fluid.

There may be interposed between the front end of the stopper seal and a transverse shoulder of the valve body, at the center of which is located the fluid inlet pipe, a rigid support washer also provided with egress means allowing fluid to penetrate between the body and this washer in order to reach the stopper seal which bears against it. The egress means are preferably constituted by radial notches provided in the face of the washer which bears against the body, the periphery of this washer being mounted with considerable radial play in the body.

An additional feature of the invention consists in using a hollow stopper seal, i.e., provided with a central blind bore, which opens out at the rear, i.e., into a chamber of the body in which the resilient means for returning the seal are mounted.

This resilient return means may comprise a cushion of gas under pressure which can be introduced through a lateral pipe passing through the wall of the body and opening out behind a flexible lip provided on the rear of the stopper seal behind its shoulder. During normal operation this lip resiliently blocks the filling aperture and only uncovers it when adequate pressure is introduced into the filling pipe.

Finally, there may be provided a rigid and stationary abutment located at a slight distance from the rear face of the stopper seal in order to limit the axial amplitude of displacement of the latter.

An embodiment of the present invention will now be described, by way of example, with reference to the accompanying drawing, in which.

Figure 5:
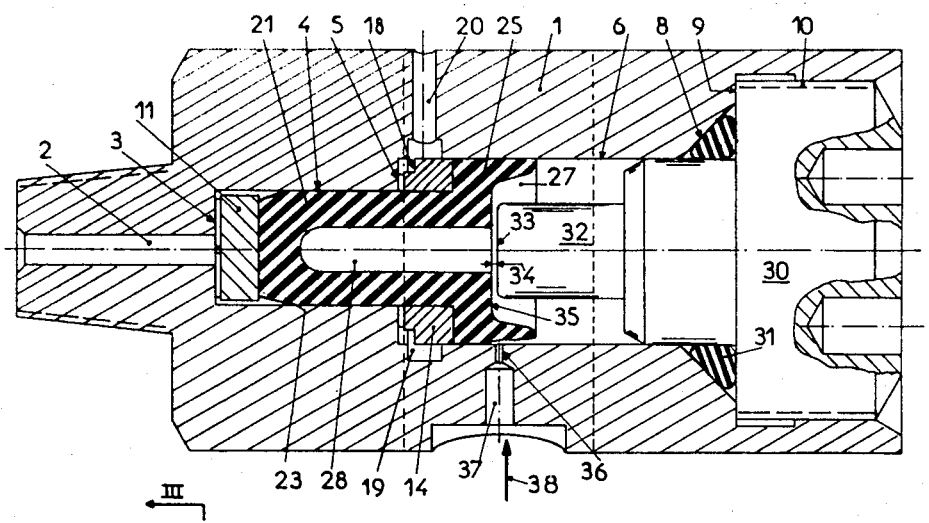
Figure 1:
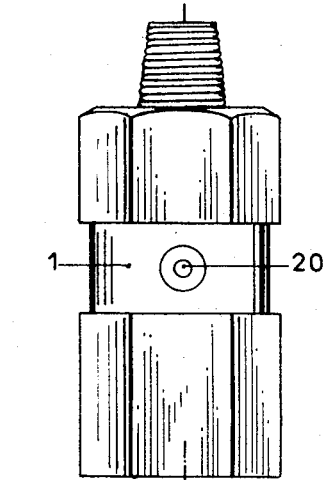
FIG. 1 is an elevational view of a safety valve according to the invention.

There has been shown on the drawings a safety valve or sliding valve, intended for use on a hydraulic prop of the type which provides support in mines.

The liquid under pressure coming from the main circuit of the prop is introduced into the body 1 of the valve through an axial pipe 2. The latter opens out at the center of an internal shoulder 3 of the body 1, which shoulder is extended by a cylindrical housing 4. The housing 4 widens out in turn at a transverse shoulder 5 which is extended towards the rear of the body by another cylindrical housing 6, the dimater of which is greater than that of the housing 4. At the rear, the housing 6 has a flared, truncated seating 8 which opens at the center of a plane transverse shoulder 9, which is extended by a cylindrical housing of still greater diameter, provided with an inner screw-thread 10. In other words, the diameters of the cylindrical parts 2, 4, 6, 10 increases continually from one end of the body 1 to the other.

A rigid washer 11, made for example of metal, is disposed at the shoulder 3. This washer has a plane front face 12 in which are cut radial notches 13. Moreover, the diameter of the washer 11 is clearly less than the inner diameter of the housing 4, such that this washer 11 fits in the housing 4 with considerable radial play.

Figure 2:
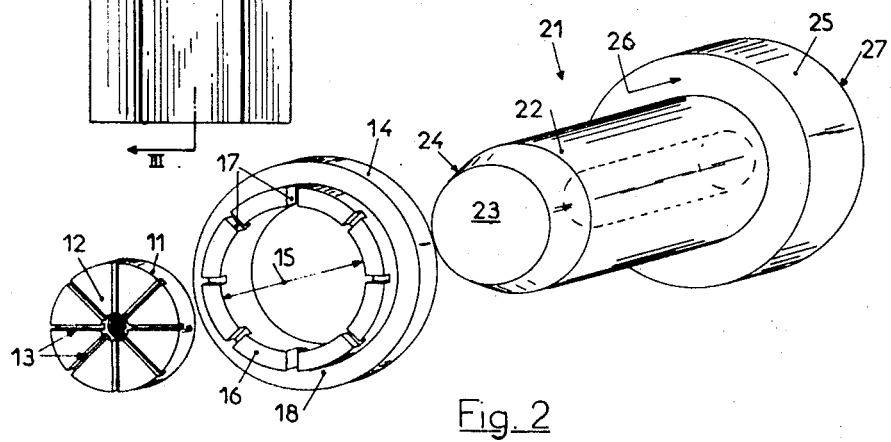
FIG. 2 is an exploded perspective view showing the stopper seal, the anti-extrusion valve and the support washer.

Moreover, the arrangement comprises an anti-extrusion ring 14, also made of rigid material, for example of metal. This anti-extrusion ring has an inner diameter 15 which (FIG. 2) is substantially equal to that of the housing 4. The plane front face 16 of the ring 14 has a series of radial notches 17 intended to bear against the shoulder 5 of the body. The periphery of this ring 14 is preferably provided with a groove 18, into which all the notches 17 open.

When the ring 14 is in position (FIG. 5) the groove 18 communicates with a peripheral recess 19 of the corresponding region of the housing 6, this recess constituting an annular chamber into which opens a pipe 20 which passes radially through the wall of the body 1.

The fluid-tight part of the valve is constituted by a stopper seal 21, made in one piece of deformable material, for example rubber or plastics material. This stopper seal has a main cylindrical part 22 which is mounted, practically without play, inside the housing 4. At the front, the cylindrical part 22 is terminated by a plane, transverse base 23 able to bear against the washer 11. An end chamfer 24 is preferably provided where the cylindrical part 22 joins the base 23.

At the rear, the stopper seal 21 has a cylindrical part 25 of greater diameter which is connected to the cylindrical part 22 by a plane, transverse shoulder 26 able to bear against the rear face of the anti-extrusion ring 14.

The rear of the cylindrical part 25 is preferably recessed so as to have a slight depth of wall in the form of a flexible lip 27.

The deformable stopper seal 21 is hollow, that is, a blind axial bore 28 is provided inside the cylindrical part 22 and opens at the rear surface of the seal 21 inside an axially projecting lip 27, as seen in FIG. 5.

Behind the stopper seal 21, there is mounted in the body 1 a stationary cut-off member 30, for example fixed in the screw-thread 10, with the interposition of an annular gasket 31 which is compressed on the truncated seating 8.

At the front, the cut-off member 30 has a fixed abutment 32, the plane terminal face 33 of which is located at a slight distance 34 from the rear transverse face 35 defined on the stopper seal 21, at the center of the lip 27.

In the wall of the cylindrical housing 6, behind the region normally blocked by the flexible lip 27, there is provided a filling aperture 36 connected to the outside of the body 1 by a transverse pipe 37 able to receive a filling adapter of known type, not shown.

The operation is as follows:

To effect operation of the valve it is inflated by feeding into the pipe 37, a gas under pressure, for example nitrogen. The supply of gas (arrow 38) temporarily lifts the lip 27 to the level of the aperture 36 and the pressure of the nitrogen is established in the chamber defined inside the fixed housing. In particular, the nitrogen under pressure rushes into the central housing 28 of the stopper seal 21 and keeps it hermetically sealed against the cylindrical wall of the housing 4.

Figure 3:
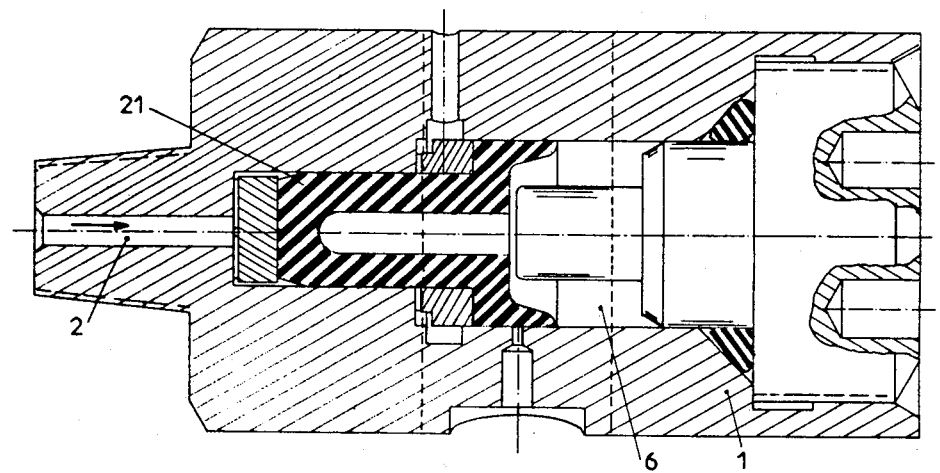
FIG. 3 is a section on the line III—III of FIG. 1 of the valve at rest.

The valve is thus closed and is able to resist the pressure of the fluid admitted through the pipe 2. It thus remains in the rest position shown in FIG. 3, the pipe 2 being connected to a circuit under pressure which can be, for example, that of a hydraulic pit prop.

Figure 4:
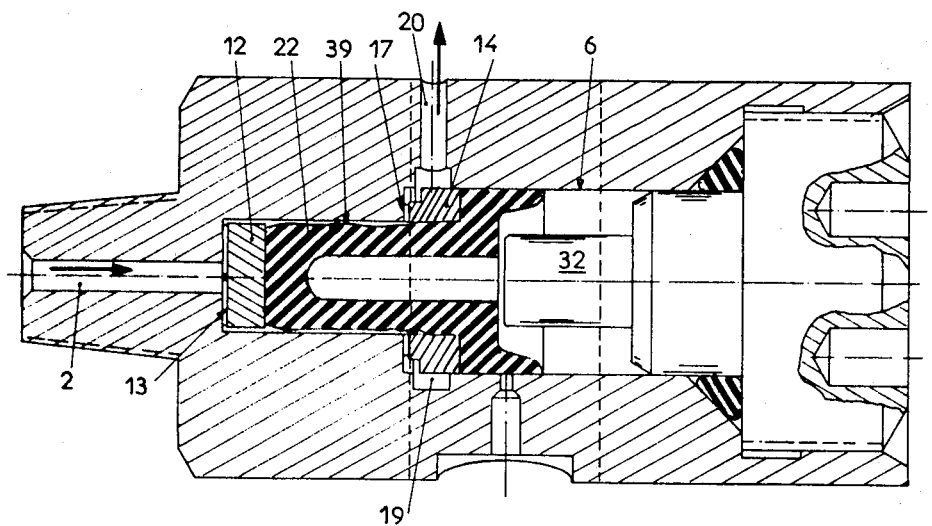
FIG. 4 is a similar view to FIG. 3 showing the valve in the leaking position, when the inlet fluid is at an excess pressure; and, FIG. 5 is a similar section showing the valve during introduction of the return cushion of gas.

In the case of excess pressure in the pipe 2, for example, under the thrust of the mine walls, the fluid in the pipe 2 penetrates through the grooves 13 of the support washer 11, along the wall of the housing 4 and exerts a force which prevails over that of the gas contained in the housing 6. Under this force the stopper seal 21 contracts, at least in its cylindrical part 22 until defining an escape gap 39 is defined, as shown in FIG. 4 which allows the fluid in the pipe 2 to reach the notches 17 of the anti-extrusion ring 14, and then from there to the groove 18, to the chamber 19 and to the outlet pipe 20. Simultaneously, the stopper seal 21 tends to withdraw, but the abutment 32 prevents any undue amplitude of this movement.

As soon as this slight leak has allowed an adequate volume of fluid to escape in order to reduce the pressure in the pipe 2, the return action of the cushion of gas in the housing 6 again becomes predominant and the stopper seal again expands, thus ensuring, as previously, the fluid tightness in the cylindrical housing 4.

The advantages of this construction are the following:

The deformable material of the stopper seal 21 is compressed against the fluid pressure in the pipe 2; this method of operation is very favourable for a good durability, and in particular for good upkeep of the material of the stopper seal 21 in the face of hammering or pressure waves in the pipe 2 and in the upstream circuit.

In the case of excess pressure, or hammering, the part 22 of the seal 21 contracts and the liquid passes directly to the reservoir, i.e., directly from the pipe 2 to the pipe 20; the seal 21 can therefore not be burst.

The anti-extrusion ring 14 and the support washer 12 prevent any deterioration of the deformable material of the stopper seal 21.

What we claim is:

1. A safety valve for a hydraulic circuit, especially for hydraulic pit props, comprising a hollow rigid body, inlet and outlet pipes in said body, a cut-off member consisting of a stopper seal formed of deformable material positioned within said hollow rigid body between said inlet and outlet pipes, said stopper seal formed with a main cylindrical wall, the base of said wall passing through a rigid anti-extrusion ring within said body, the stopper seal having a cylindrical part of greater diameter than the cylindrical wall, said cylindrical part positioned behind and adjacent to said ring and forming a transverse shoulder, the anti-extrusion ring bearing against an inner shoulder of the hollow rigid body, and egress means to said outlet pipe being provided between the body and the anti-extrusion ring, the fluid tightness of the stopper seal being effected in its normal position by contact of the external surface of the main cylindrical wall of said stopper seal with an end face of the cavity in said body, said end being connected to the fluid inlet pipe.

2. A safety valve according to claim 1, in which the anti-extrusion ring is made in the form of a ring having one face bearing against the body, said face being provided with radial notches to allow leakage of fluid from the inlet pipe to the outlet pipe upon deformation of said stopper seal.

3. A safety valve according to claim 1 further comprising a rigid support washer inserted between the end of the stopper seal adjacent said end face in said cavity and said end face of the cavity formed in the valve body, at the center of which is disposed the fluid inlet pipe, said rigid support washer being provided with egress means to allow fluid to penetrate between the wall of said rigid body and the washer in order to reach the stopper seal which bears against it.

4. A safety valve according to claim 3, wherein said egress means comprises radial notches provided in the face of the washer which bears against the end of the hollow cavity formed within said rigid body, the periphery of the washer being mounted with considerable radial play relative to the body.

5. A safety valve according to claim 1, wherein the stopper seal is provided with a central blind bore, said blind bore opening into the cavity in said body in a direction opposite the position of said inlet pipe.

6. A safety valve according to claim 1, further comprising a cushion of gas under pressure provided in said hollow rigid body, said pressure gas providing the return means for the seal, a lateral gas-conveying pipe passing through the wall of the rigid body and opening out through an aperture located behind a flexible lip provided on the end of the stopper seal extending into the cavity in said body behind its shoulder, said lip blocking the aperture elastically in normal operation and uncovering said aperture only when an adequate filling pressure is fed to the gas-conveying pipe.

7. A safety valve according to claim 1, further comprising a rigid stationary abutment located at a slight distance from the rear face of the stopper seal, to limit the amplitude of displacement of said stopper seal axially.

* * * * *